Jan. 24, 1939. C. HIRST 2,144,972
GAUGING, MEASURING, SETTING, INDEXING, AND LIKE INSTRUMENT OR DEVICE
Filed March 4, 1937 6 Sheets-Sheet 3
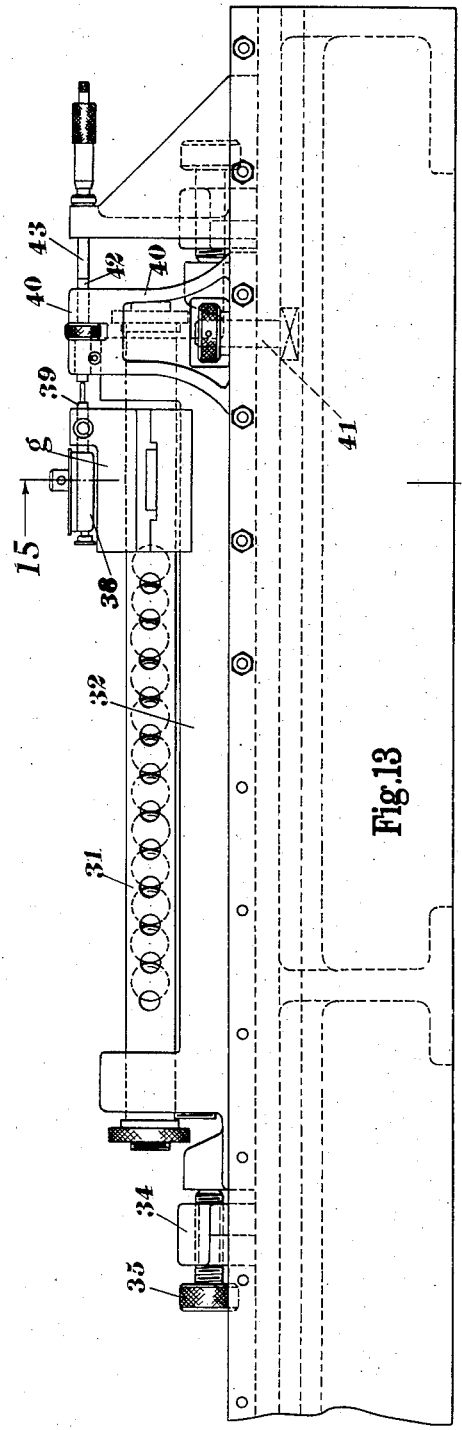
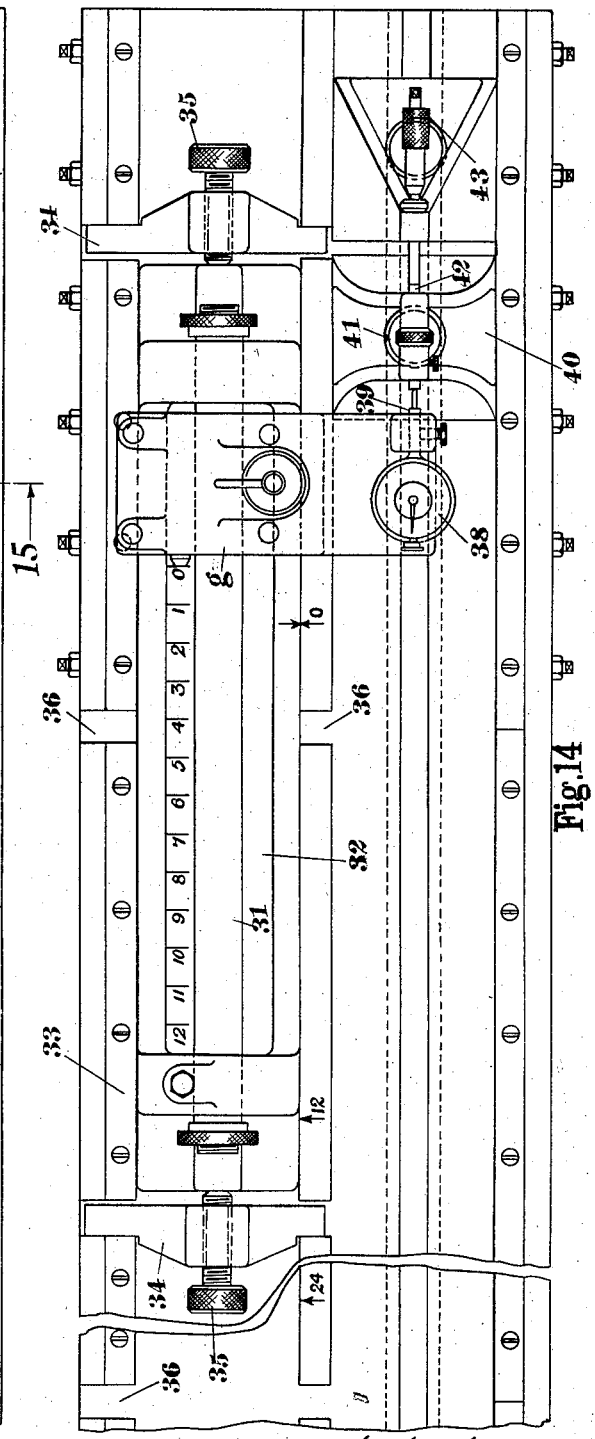

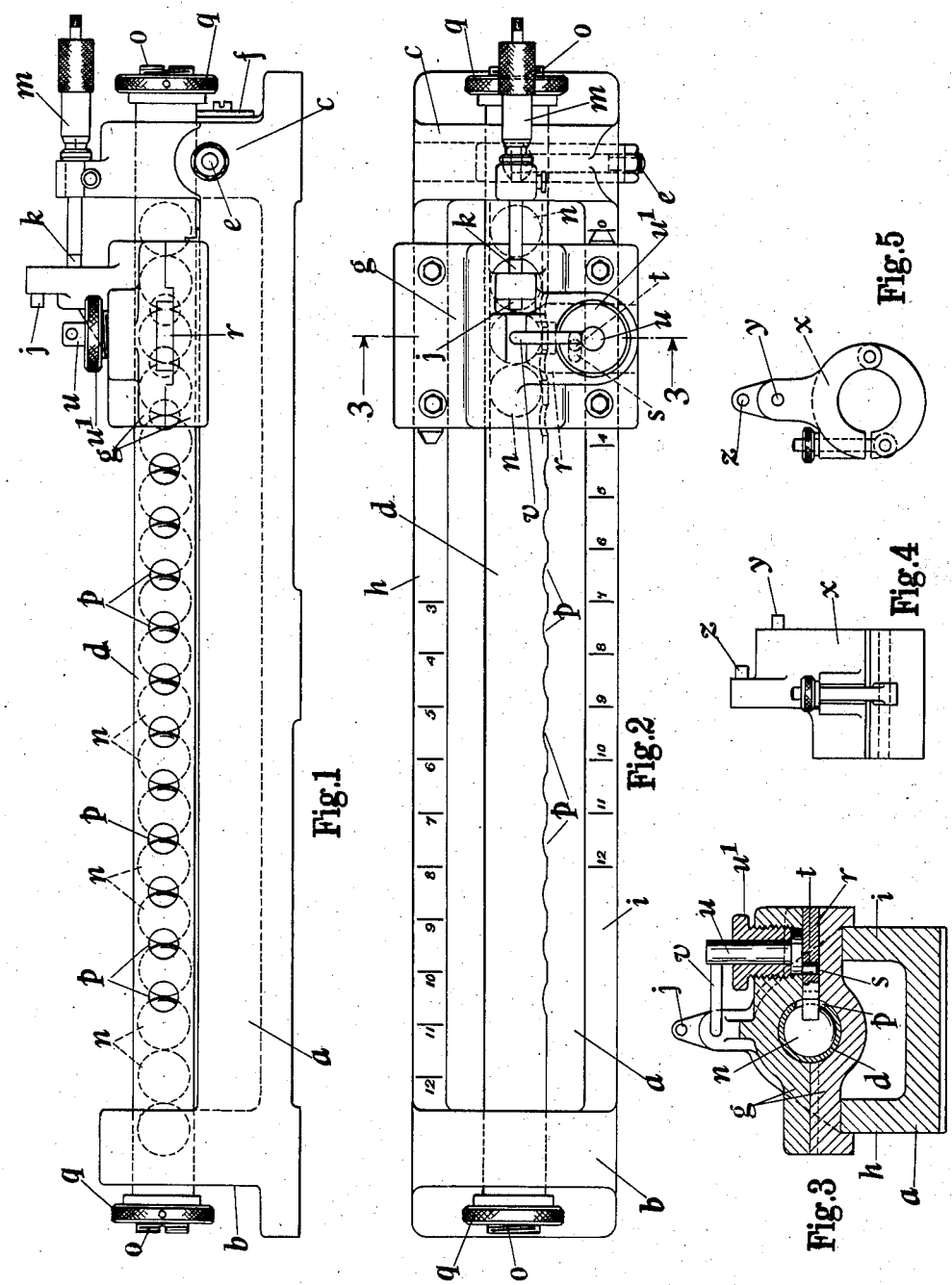

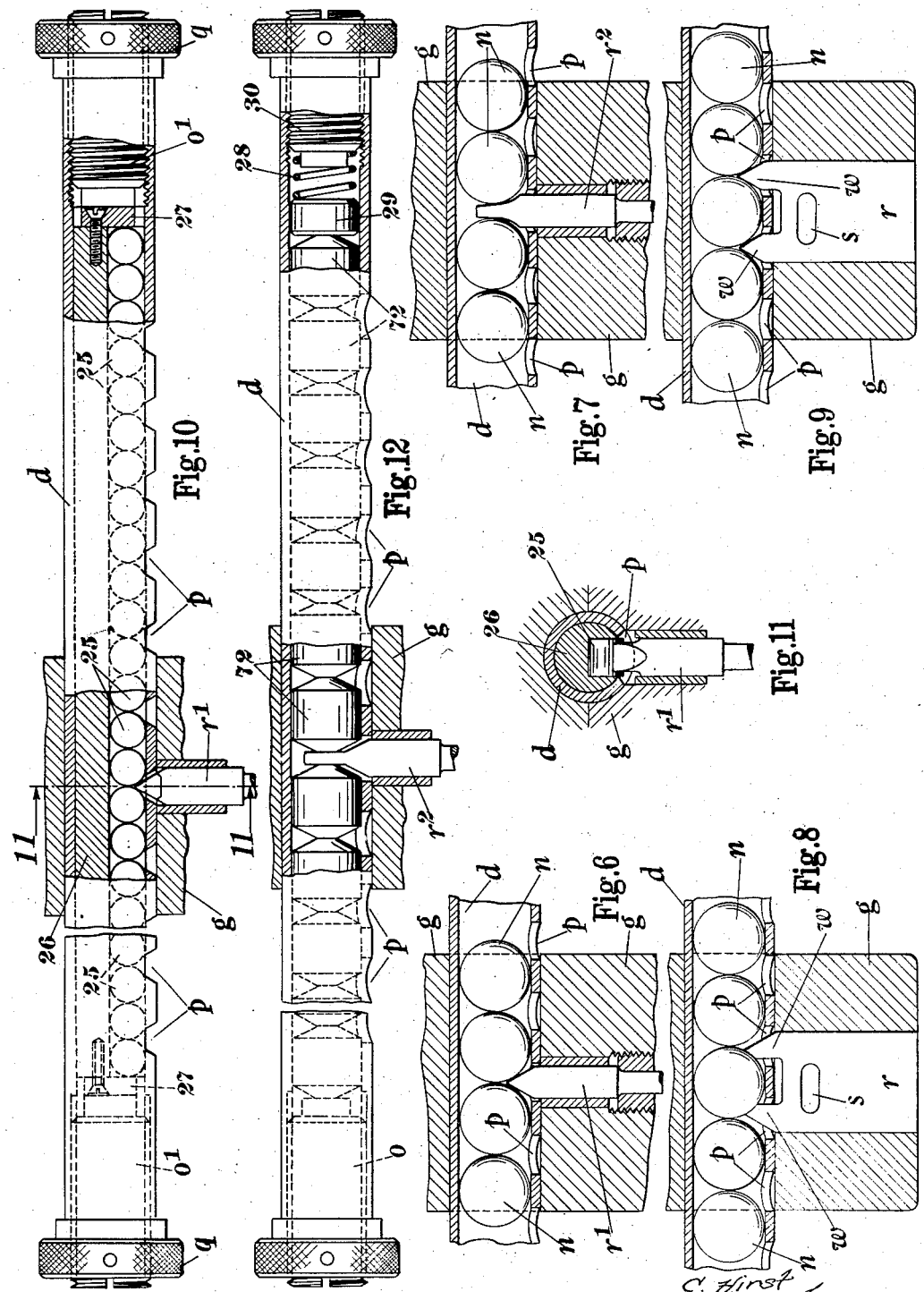

Jan. 24, 1939.  C. HIRST  2,144,972
GAUGING, MEASURING, SETTING, INDEXING, AND LIKE INSTRUMENT OR DEVICE
Filed March 4, 1937  6 Sheets-Sheet 4

C. Hirst
INVENTOR
By Glascock Downing & Seebold
ATTYS

Jan. 24, 1939.                C. HIRST                2,144,972
GAUGING, MEASURING, SETTING, INDEXING, AND LIKE INSTRUMENT OR DEVICE
Filed March 4, 1937          6 Sheets-Sheet 5

Jan. 24, 1939.  C. HIRST  2,144,972
GAUGING, MEASURING, SETTING, INDEXING, AND LIKE INSTRUMENT OR DEVICE
Filed March 4, 1937   6 Sheets-Sheet 6
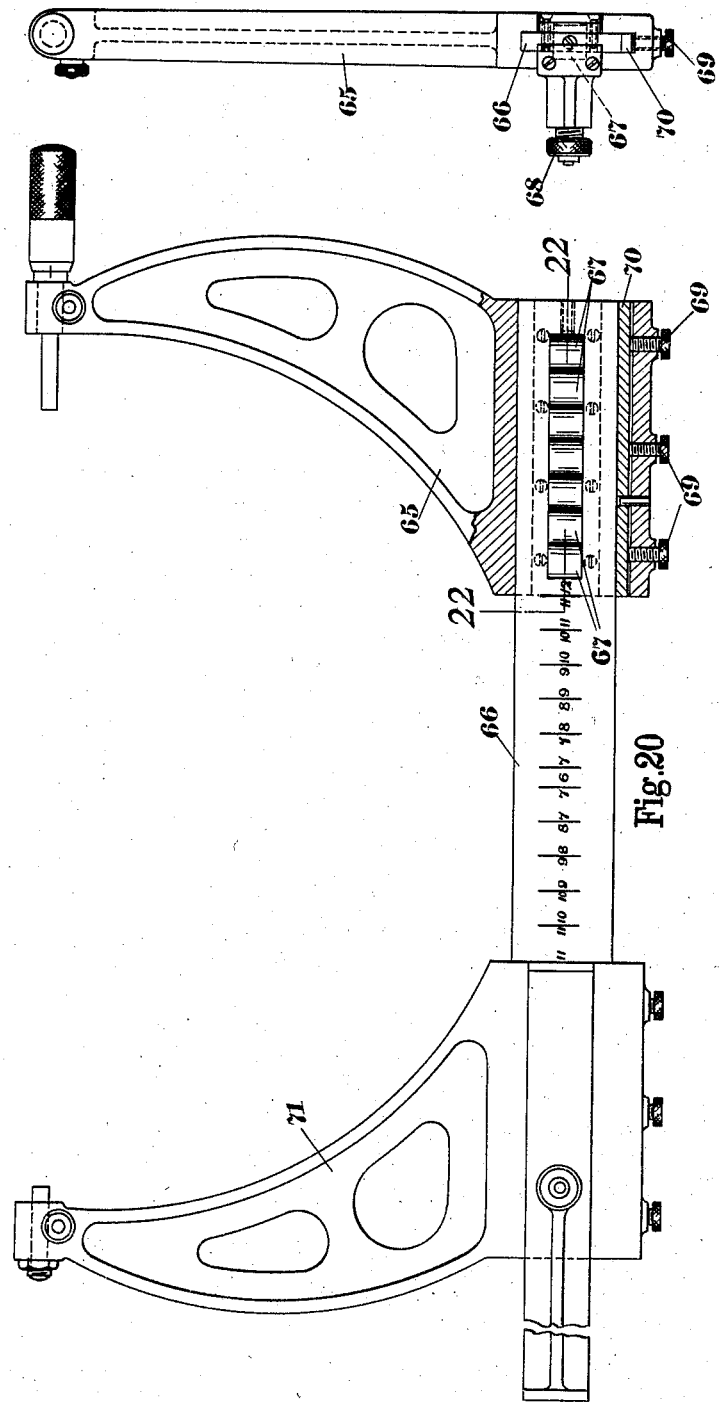

Patented Jan. 24, 1939

2,144,972

UNITED STATES PATENT OFFICE 2,144,972

GAUGING, MEASURING, SETTING, INDEXING, AND LIKE INSTRUMENT OR DEVICE

Cecil Hirst, Withington, Manchester, England

Application March 4, 1937, Serial No. 129,050
In Great Britain March 17, 1936

16 Claims. (Cl. 33—164)

This invention relates to gauging, measuring, setting, indexing and like instruments or devices which can be applied for example to various machine tool beds, slides, uprights or the like for accurate setting, to precision setting and measuring and to jig and gauge making for the accurate measurement of dimensions which cannot be dealt with conveniently by existing measuring instruments and to dividing heads and tables for indexing purposes.

The invention resides in the novel combinations and arrangements of parts hereinafter described and defined in the appended claims.

Referring to the accompanying explanatory drawings:—

Figure 1 is an elevation and Figure 2 a plan view of a gauge or measuring instrument constructed and arranged in one convenient form in accordance with this invention.

Figure 3 is a cross sectional view on the line 3—3 of Figure 2.

Figures 4 and 5 are side and end views of an accessory for use in the instrument shown in Figures 1, 2 and 3 for the purpose of adapting such instrument for the making of internal measurements.

Figures 6, 7, 8 and 9 illustrate four modifications or forms of the reference bar or beam incorporated in the instrument shown in Figures 1 and 2.

Figures 10 and 11 are respectively longitudinal section, and cross section on the line 11—11 of Figure 10, illustrating a further modified form of the reference bar or beam.

Figure 12 is a longitudinal section through a still further modified form of the reference bar or beam.

Figure 13 is an elevation, Figure 14 a plan view and Figure 15 a sectional view on the line 15—15 of Figure 13 illustrating a form of gauge or instrument embodying my invention, which is adapted for wide range measurements.

Figure 20 is an elevation partly in section, Figure 21 an end view and Figure 22 a plan view partly in section on the line 22—22 of Figure 20 showing a caliper type of gauge constructed in one convenient form in accordance with this invention.

Figure 16:
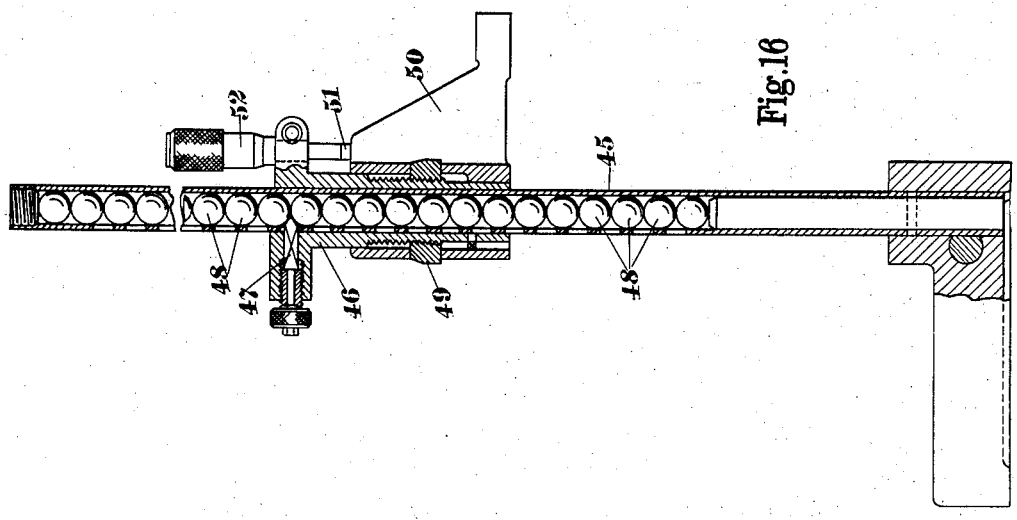
Figure 16 is a sectional elevation of a height gauge constructed in one convenient form in accordance with this invention.

Referring in the first place to Figures 1–5, the instrument or machine there illustrated comprises a base $a$ having two brackets $b$, $c$ thereon, one at each end. The said brackets are bored to receive the ends of the reference bar or beam $d$ which is clamped at one end in the bracket $c$ by the lock bolt $e$. A flat is provided at one end of the reference bar or beam for engagement by a keep plate $f$ secured to the bracket $c$, the said keep plate maintaining the reference bar or beam in correct position so far as circular location is concerned, in the casting.

A sliding head $g$ made in two halves bolted together is carried as a sliding fit upon the reference bar or beam and is supported at its opposite sides by the raised sides $h$ and $i$ of the casting as shown in Figure 3. There are two anvils $j$ and $k$ fixed to the sliding head $g$, one $j$ for internal and the other $k$ for external measurements. The latter anvil $k$ co-operates with a micrometer head $m$ secured in the top of the bracket $c$.

The reference bar or beam $d$ is of hollow tubular form adapted to receive measuring units which in the example illustrated are balls $n$. There is a screwed plug $o$ to close each end of the tube and hold the balls in correct location with relation to holes or slots $p$ machined in the tube $d$ in line with one another and adapted to come each with its centre opposite the point of contact of each pair of adjacent balls. There are lock nuts $q$ on the plugs $o$.

The sliding head $g$ has therein a flat plunger $r$ which has a hole or gap $s$ therein into which enters a crank pin $t$ on a disc at the end of the spindle $u$ turned by the handle $v$. The bush $u^1$ when screwed down locks the plunger $r$ in engagement with the balls. Figures 8 and 9 show two constructions of flat plunger $r$ such as may be employed in the sliding head. It will be seen that the plunger has thereon two projecting teeth $w$, $w^1$ which are adapted to engage the opposite sides of a ball in the reference bar or beam $d$, the teeth entering the latter through clearance holes $p$ therein. In Figure 8, the face of the tooth $w$, $w^1$ which engages the ball differs from the shape of the similar teeth in Figure 9. As the balls are of a definite and accurate size, it is obvious that if the balls are correctly located in the length of the tube $d$ and the latter correctly positioned longitudinally in the base $a$, then with the teeth $w$, $w^1$ of the plunger $r$ engaging any ball in the reference bar or beam, the anvil $k$ will be at a definite distance from the micrometer $m$ when the latter is at zero. Adjustment of the micrometer serves for gauging for lengths less than the diameter of a ball in the tube $d$. The indications of length units upon the side $i$ of the base are for external measurements.

When the instrument or machine shown in Figures 1 and 2 is to be used for internal measurements, the fitting $x$ shown in Figures 4 and 5 is mounted upon the reference bar or beam $d$ between the sliding head $g$ and the micrometer $m$, with the anvil $y$ upon the fitting in contact with the micrometer end. The anvil $z$ on the fitting then serves in conjunction with the anvil $j$ on the sliding head for the taking of internal measurements. The indications upon the raised side $h$ of the base serve for internal measurements.

The sliding head $g$ can be moved along the reference bar or beam $d$ to any desired position to suit the dimensions of the part being gauged. The plunger $r$ is then passed with its teeth $w$, $w^1$ through the most convenient holes $p$ in the reference bar or beam in order to engage a ball therein. The micrometer $m$ is then adjusted to measure any distance less than the diameter of a ball $n$.

Figure 6 shows a different form of plunger $r^1$ for engaging the balls $n$. Such plunger is not as satisfactory as those shown in Figures 8 and 9 because it tends to wedge the balls $n$ apart, and may thereby introduce small inaccuracies due for example to the balls not being a fairly tight fit in the bore of the tube $d$. I may however minimize or obviate this inaccuracy by limiting the movement of the plunger in a direction to engage the balls so that the pressure applied between the plunger and balls is a minimum and always the same.

In Figure 7, the plunger $r^2$ definitely wedges itself between adjacent balls, the balls at one side yielding against spring pressure as will be explained later with reference to Figure 12, but the balls at the other side remaining rigid and in firm contact with one another.

In the construction of reference bar or beam shown in Figures 10 and 11, rollers 25 are held in a channel like recess or groove in a part 26 which is passed into the tubular reference bar or beam $d^1$. The said recess or groove is closed at its ends by plates 27. Plugs $o^1$ close the ends of the tube $d$ and ensure that the rollers are correctly located with reference to the holes $p$ in the side of the tube $d$. The plunger $r^1$ which is similar to that shown in Figure 6 enters between the circular faces of two rollers, the sliding head $g$ being movable along the bar or beam $d$ to suit the size of the part to be measured.

The reference bar or beam shown in Figure 12 has rollers or rods 27 with conical ends therein, the measurements being taken by causing the plunger $r^2$ which is similar to that shown in Figure 7 to enter between the conical ends of two rollers. The rollers at one side of the plunger end are in firm contact with one another and with the plug $o$ in the end of the tube $d$ but the rollers at the opposite side of the plunger can move against the pressure of the spring 28 which is provided between a bearing pad 29 and a plug 30 for closing the end of the tube $d$.

Balls or rollers are made commercially to a very high degree of accuracy and in the assembly of my improved reference bar or beam, I gauge each ball or roller and if one is slightly undersize use a next ball slightly oversize to compensate or cancel the cumulative error over a beam of a length involving the use of a number of balls.

Figure 15:
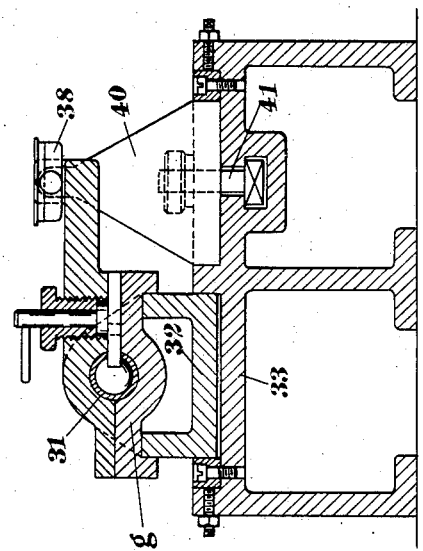

In the construction shown in Figures 13, 14 and 15, the reference bar or beam 31 is mounted in a carriage 32 similar to the base $a$ of Figures 1, 2 and 3, but the said carriage can be placed in any one of several positions in a machine bed 32 and adjusted and held in such positions by clamps 34 and clamping screws 35, the clamps entering recesses 36 in side walls 37 on the base. There is a sliding head $g$ upon the reference bar or beam with a plunger and operating handle exactly as in Figures 1, 2 and 3. The sliding head carries a gauge clock or dial type indicating instrument 38 which works in conjunction with the presser 39. There is a movable slide 40 which can be adjusted along the length of the bed 33 in slideways as shown in Figure 15 and can be clamped where desired by the bolt 41. The slide carries a double ended anvil 42 which can be adjusted longitudinally in the slide by a thrust nut for setting purposes. One end of the anvil 42 co-operates with the micrometer 43 supported in a fixed head 44 and the other end of the anvil co-operates with the presser 39. The carriage 32 is transferred to the position in the bed 33 giving a desired measurement, that is the arrow head 32ª on the carriage can be put against the 0, 12, 24 or other measurement marking on the bed. The sliding head $g$ is then adjusted upon the tube 31 and the slide 40 moved till its anvil 42 contacts with the indicator presser 39, and the anvil 42 is adjusted until the indicator reads zero. Measurements can now be made between the anvil 42 and the micrometer 43.

In the height gauge shown in Figure 16, the reference bar or beam 45 constitutes the vertical column along which the sleeve 46 can be slid in order to enable the plunger 47 to be passed through a hole in the reference bar or beam and into position between a pair of balls 48 in the bar or beam. The sleeve 46 has a threaded portion engaged by a nut 49 located in a slot in a head 50 having an anvil 51 thereon which co-operates with the micrometer 52 carried by the sleeve 46. The movement of the sleeve 46 along the reference bar or beam is for measurements involving so many units of length as represented by the balls 48 and the use of the micrometer 52 and the nut 49 covers measurements of less than a unit of length.

Figure 17:
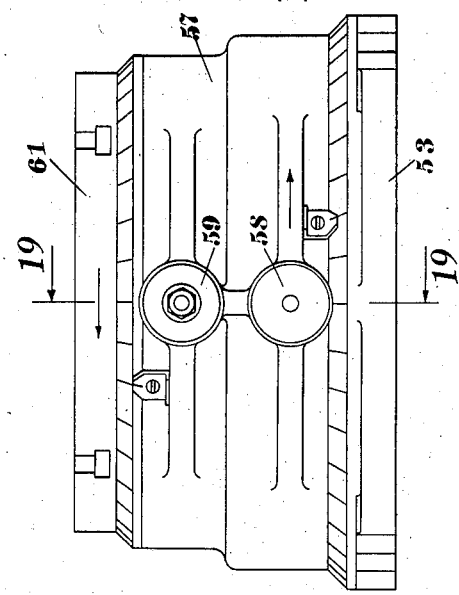
Figure 17 is an elevation, Figure 18 a plan view partly in section and Figure 19 a sectional view on the line 19—19 of Figure 17 showing a gauge for circular measurements constructed and arranged in one convenient form in accordance with this invention.
Figure 18:
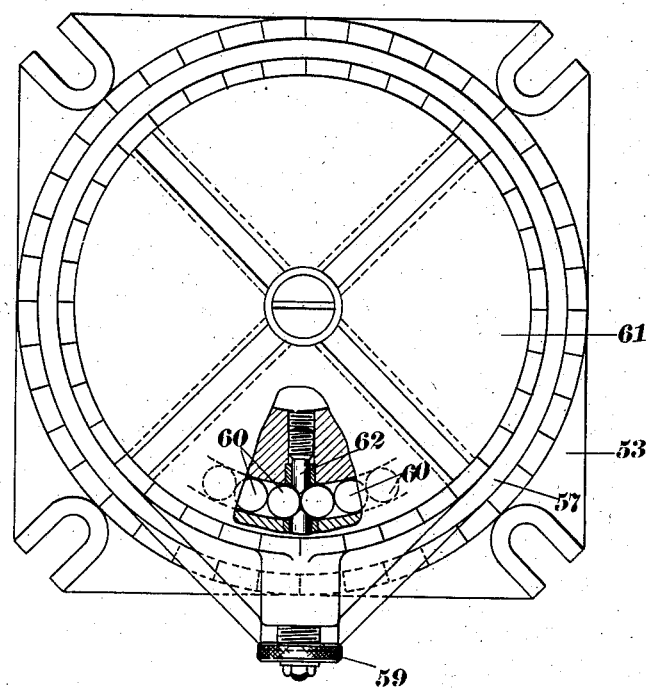
Figure 19:
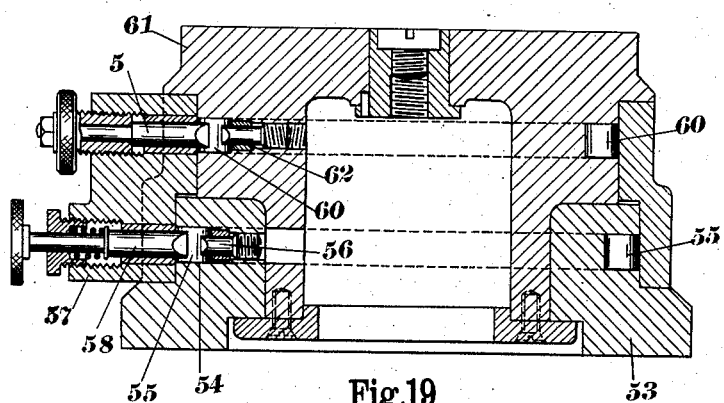

Figures 17, 18 and 19 illustrate a compound circular dividing head constructed in accordance with this invention. The base 53 has a peripheral groove 54 therein to receive rollers 55 which are held against movement around the groove by an adjustable stop 56. There is a sleeve 57 which can be turned upon the base 53 and this sleeve has therein a spring loaded plunger 58 to engage between a pair of rollers in the groove 54. A second plunger 59 in the sleeve 57 co-operates with a set of rollers 60 in a groove in the top portion 61 of the dividing head. The rollers 60 are prevented from turning in the groove by the adjustable stop 62. The arrangement in the head 61 is similar to that in the base 53. The number and diameter of rollers in the head 61 are different from the number and diameter of rollers in the base 53, so that by turning the sleeve 57 forward or backward upon the base 53 and the head 61 forward or backward within the sleeve 57, adjustments of the head 61 can be made through large or small angles as desired.

For a simple form of dividing head, there will be a head with balls or rollers located in a groove therein, the head turnable about a base having a plunger thereon to engage the balls or rollers.

The caliper type of gauge shown in Figures 20-22 has one arm 65 movable upon the reference bar or beam 66 which has rollers 67 held therein, the plunger 68 upon the base of the leg 65 which slides over the reference bar or beam permitting adjustment of the leg for the units of length determined by the diameter of the rollers. The micrometer 68 in the leg 65 serves for measurements less than the diameter of a roller 67. When the leg 65 has been adjusted along the reference bar or beam, it can be clamped to the latter by the studs 69 bearing upon a slipper 70 which rides upon the reference bar or beam. A similar arrangement for adjusting the other leg 71 of the caliper upon the other end of the reference bar or beam may be provided.

Instead of employing balls or rollers or rods in my improved instrument, I may employ a combination of balls and rollers or rods. Relatively long rods with intervening balls may be for example employed.

What I claim is:—

1. A gauging, measuring, setting, indexing or like instrument or machine, comprising a member, a row of elements of circular cross-section constituting units of length wholly within said member, a further member mounted for movement upon said first mentioned member, a withdrawable plunger mounted in said further member, and a series of holes in said first mentioned member by which said plunger has access to the peripheries of said elements of circular cross-section.

2. A gauging, measuring, setting, indexing or like instrument comprising a hollow member, a row of elements of identical circular cross-section within said member, each element of circular cross-section being in unbroken peripheral contact with the inside surface of the hollow member and being also in contact with at least one other element at a point on its circular periphery, holes in said hollow member between the lines of contact of said members of circular cross-section with said hollow member, a further member mounted for movement upon said first mentioned member, and a withdrawable plunger mounted in said last mentioned member and arranged to engage the peripheries of selected elements of said row of elements of circular cross-section by passage through said holes.

3. A gauging, measuring, setting or like instrument or machine comprising a tubular member, a row of identical elements of circular cross-section within said member, each being in unbroken peripheral contact with the inside walls of said tubular member, holes in said tubular member between said unbroken lines of contact, a further member slidable along the exterior of said tubular member and a plunger mounted for movement solely longitudinally in said further member, said plunger penetrating said holes and selectively engaging the circular peripheries of said elements.

4. An instrument or machine as claimed in claim 2, comprising a tube, a frame carrying said tube, balls in said tube, plugs in the tube ends to hold said balls in contact with one another, the said tube having holes therein, a slider movable along the tube, a plunger upon the slider for entering the holes in the tube and engaging the balls, and gauging means upon the slider and frame.

5. An instrument or machine as claimed in claim 2, comprising a tube, a frame carrying said tube, balls in said tube, plugs in the tube ends to hold said balls in contact with one another, the said tube having holes therein, a slider movable along the tube, a plunger upon the slider for entering the holes in the tube and engaging the balls, and gauging means upon the slider and frame, a gauging stop upon said slider and a micrometer co-operating therewith mounted upon said frame.

6. An instrument or machine as claimed in claim 2, comprising a tube, a frame carrying said tube, balls in said tube, plugs in the tube ends to hold said balls in contact with one another, the said tube having holes therein, a slider movable along the tube, a plunger upon the slider for entering the holes in the tube and engaging the balls, and gauging means upon the slider and frame together with a fitting upon and adjustable in position along said tube, between the slider and the gauging means upon the frame, said fitting having two gauging stops upon the same side thereof.

7. An instrument or machine as claimed in claim 2 comprising a tube, elements of circular cross-section in said tube, plugs in the tube ends to hold said members in contact with one another, holes in said tube, a slider movable along the tube, a plunger upon the slider for entering the holes and engaging the elements, a gauging stop upon the slider, a frame carrying said tube, a second frame carrying said frame in one of a plurality of definite positions, a slide movable on said second frame in a direction parallel with the axis of said tube, a second gauging stop upon said slide, and a third gauging stop upon said second frame.

8. A gauge comprising a tube, balls in said tube in contact with one another and having a complete circle of contact with the inside of said tube, holes in said tube, a slider upon said tube, a plunger mounted for longitudinal movement only upon said slider to penetrate said holes and selectively engage said balls, a support carrying said tube and gauging means upon said support and said slider.

9. A gauge as claimed in claim 8 wherein a part of said slider is tubular and threaded, having a member movable along said slider, a nut upon said threaded part to move said member, and co-operating gauging means upon said slider and said member.

10. A gauge as claimed in claim 8 wherein the plunger enters as a wedge between adjacent balls.

11. A gauge as claimed in claim 8 wherein the plunger enters as a wedge between adjacent balls and said balls at one end of said tube engage a fixed abutment and at the other end a spring pressed abutment.

12. A gauge as claimed in claim 8 wherein said plunger engages one ball at a time at two points on opposite sides of the line of contact of ball and tube.

13. A gauging, measuring, setting, indexing or like instrument or machine comprising a member, a row of elements of circular cross-section constituting units of measurement, said row being mounted in said member, so as to be restrained from endwise movement relatively thereto, the circular peripheries of said elements engaging one another, a second member mounted for movement upon said first mentioned member, and a withdrawable plunger mounted for longitudinal movement in said second member and having access to the circular peripheries of said elements.

14. A caliper gauge comprising a member, legs mounted upon and at least one of which is slidable along said member, gauging stops upon said legs, at least one of said stops being adjustable, a row of elements of circular cross-section constituting units of length mounted in said member, so as to be restrained from endwise movement relatively thereto, the circular peripheries of said elements engaging one another, together with a plunger mounted in said slidable leg for longitudinal movement, which plunger has access to the circular peripheries of said elements.

15. A gauging, measuring, setting, indexing or like machine comprising a member, a further member slidable thereon, a channel formed in at least one of said members, a row of elements of circular cross-section constituting units of measurement located in said channel, means restraining said row of elements from movement along said channel, said elements being held in fixed position in said channel with their peripheries in contact with the walls of the channel on all sides intermediate their points or lines of contact with one another, and a withdrawable plunger mounted for longitudinal movement only in said further member, said plunger having access to the said elements solely between their points or lines of contact with the walls of said channel.

16. A gauging, measuring, setting, indexing or like machine comprising a member, a further member slidable thereon, a channel formed in at least one of said members, a row of elements of circular cross-section constituting units of measurement located in said channel, means restraining said row of elements from movement along said channel, said elements being held in fixed positions in said channel with their circular peripheries in contact with one another and their centres all on the same line or circle, said elements being in contact with the walls of the channel on all sides intermediate their points or lines of contact with one another, and a withdrawable plunger mounted for longitudinal movement only in said further member, said plunger having access to the circular peripheries of said elements solely between their points or lines of contact with the walls of said channel.

CECIL HIRST.